(12) United States Patent
Coghan, IV

(10) Patent No.: US 7,133,021 B2
(45) Date of Patent: Nov. 7, 2006

(54) FINGER-FITTING POINTING DEVICE

(76) Inventor: Francis F. Coghan, IV, 12840 Saratoga Rd., Apple Valley, CA (US) 92308

( * ) Notice: Subject to any disclaimer, the term of this patent is extended or adjusted under 35 U.S.C. 154(b) by 783 days.

(21) Appl. No.: 09/681,813

(22) Filed: Jun. 9, 2001

(65) Prior Publication Data

US 2002/0186198 A1    Dec. 12, 2002

(51) Int. Cl.
*G09G 5/00* (2006.01)

(52) U.S. Cl. .................. 345/156; 345/166; 345/173

(58) Field of Classification Search ............. 345/166, 345/173, 179, 156–158, 163
See application file for complete search history.

(56) References Cited

U.S. PATENT DOCUMENTS

| | | | |
|---|---|---|---|
| 5,481,265 A * | 1/1996 | Russell | 341/22 |
| 5,489,922 A * | 2/1996 | Zloof | 345/156 |
| 5,706,026 A * | 1/1998 | Kent et al. | 345/156 |
| 6,104,379 A * | 8/2000 | Petrich et al. | 345/157 |
| 6,141,643 A * | 10/2000 | Harmon | 704/271 |
| 6,249,277 B1 * | 6/2001 | Varveris | 345/179 |
| 2001/0040550 A1 * | 11/2001 | Vance et al. | 345/156 |
| 2002/0024502 A1 * | 2/2002 | Iwasaki et al. | |
| 2002/0101401 A1 * | 8/2002 | Movahed | 345/156 |

FOREIGN PATENT DOCUMENTS

| | | | |
|---|---|---|---|
| EP | 1 122682 A1 * | 8/2001 | |
| JP | 01-136225 | * | 5/1989 |
| JP | 08-054980 | * | 2/1996 |

* cited by examiner

Primary Examiner—Richard Hjerpe
Assistant Examiner—Kimnhung Nguyen
(74) Attorney, Agent, or Firm—Law Offices of Michael Dryja

(57) ABSTRACT

A finger-fitting pointing device is disclosed. There is at least one housing. Each housing can be fabricated from a flexible, glove-like material, and fits a finger of a user. A click sensor is disposed in the underside of each housing, and is actuated by the user pressing the underside of the housing with the inserted finger against an external surface. An optical sensor is also disposed within the surface of a housing, and detects relative movement of this surface against an external surface, as caused by relative movement of the user's finger.

19 Claims, 3 Drawing Sheets

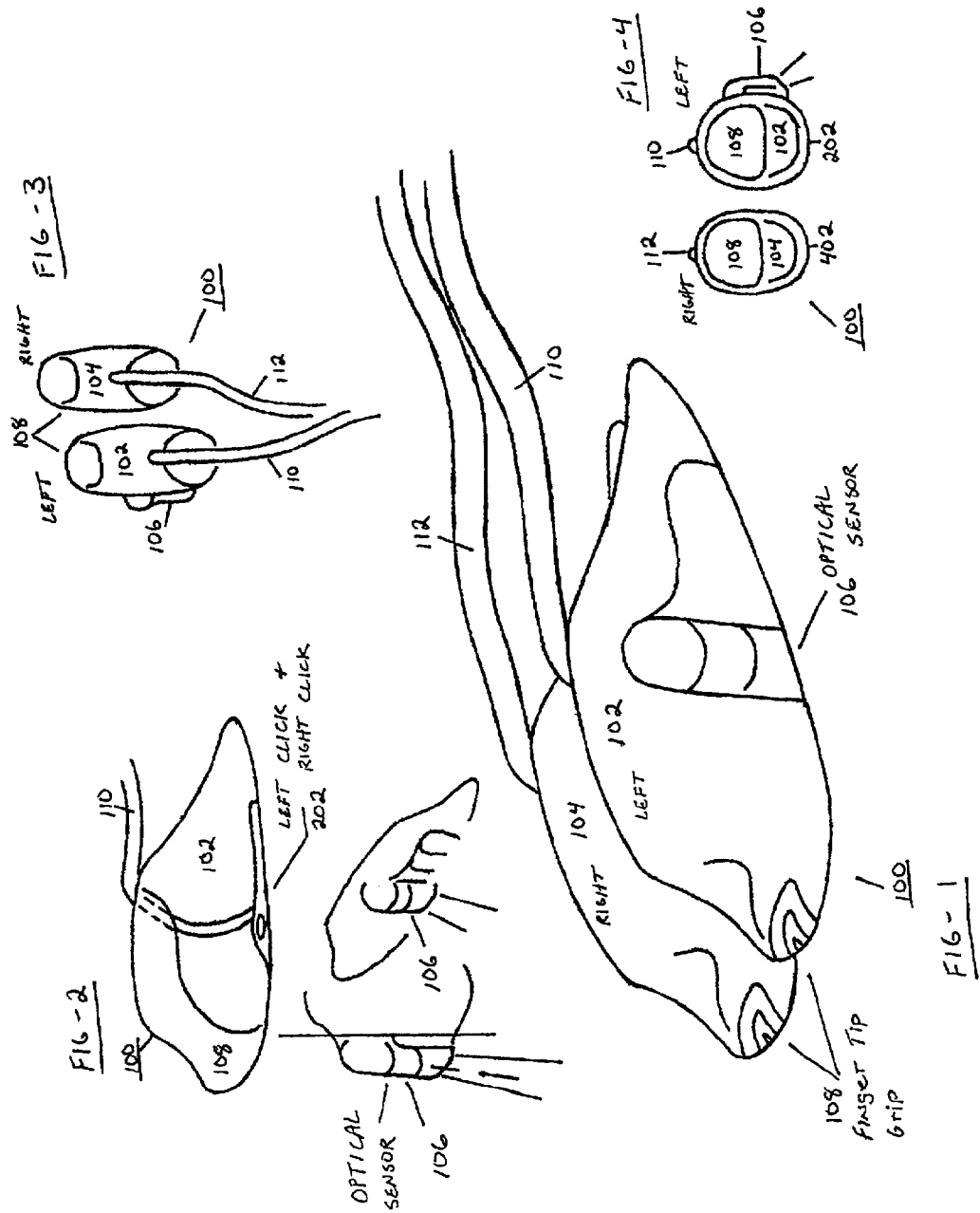

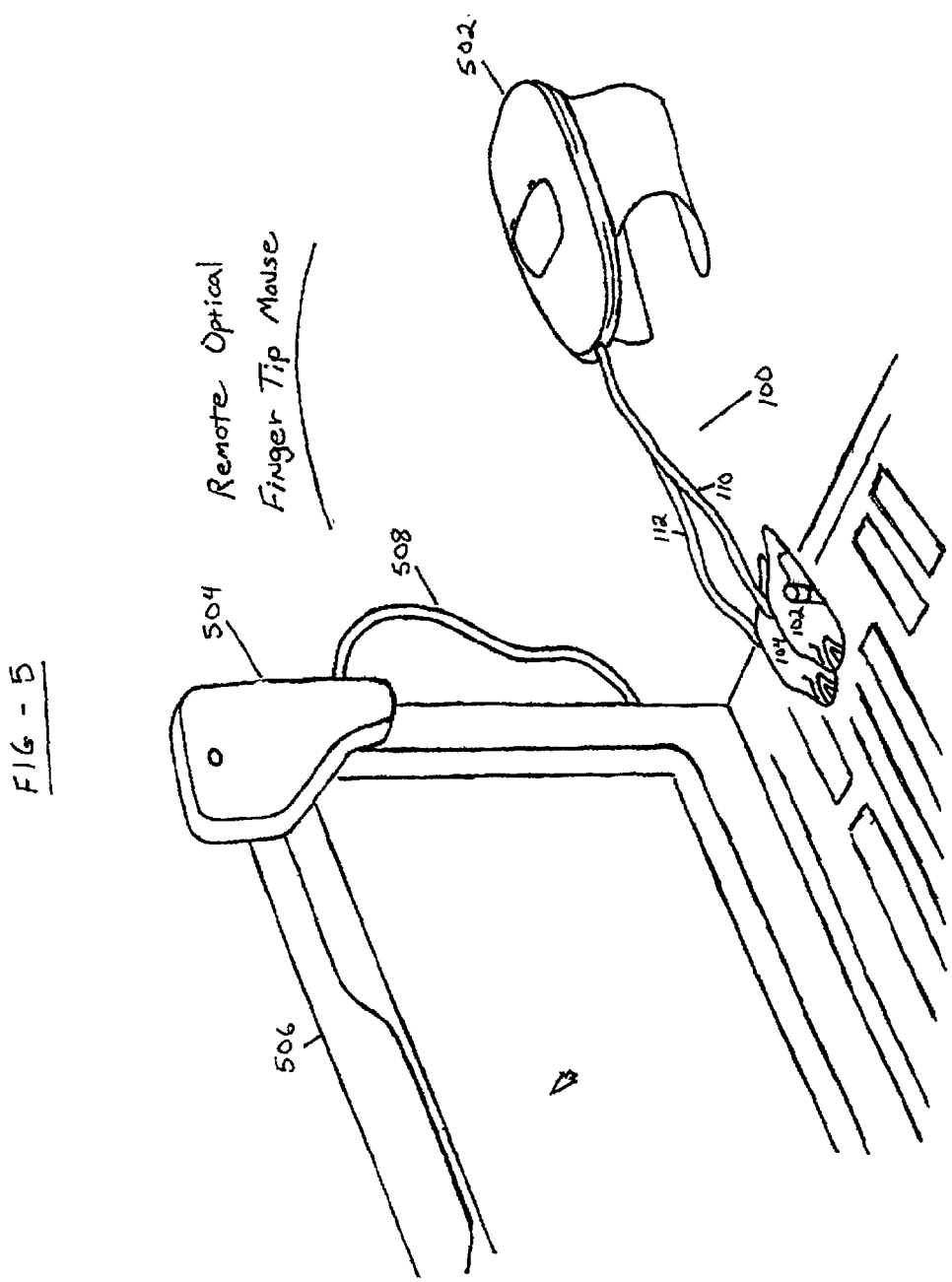

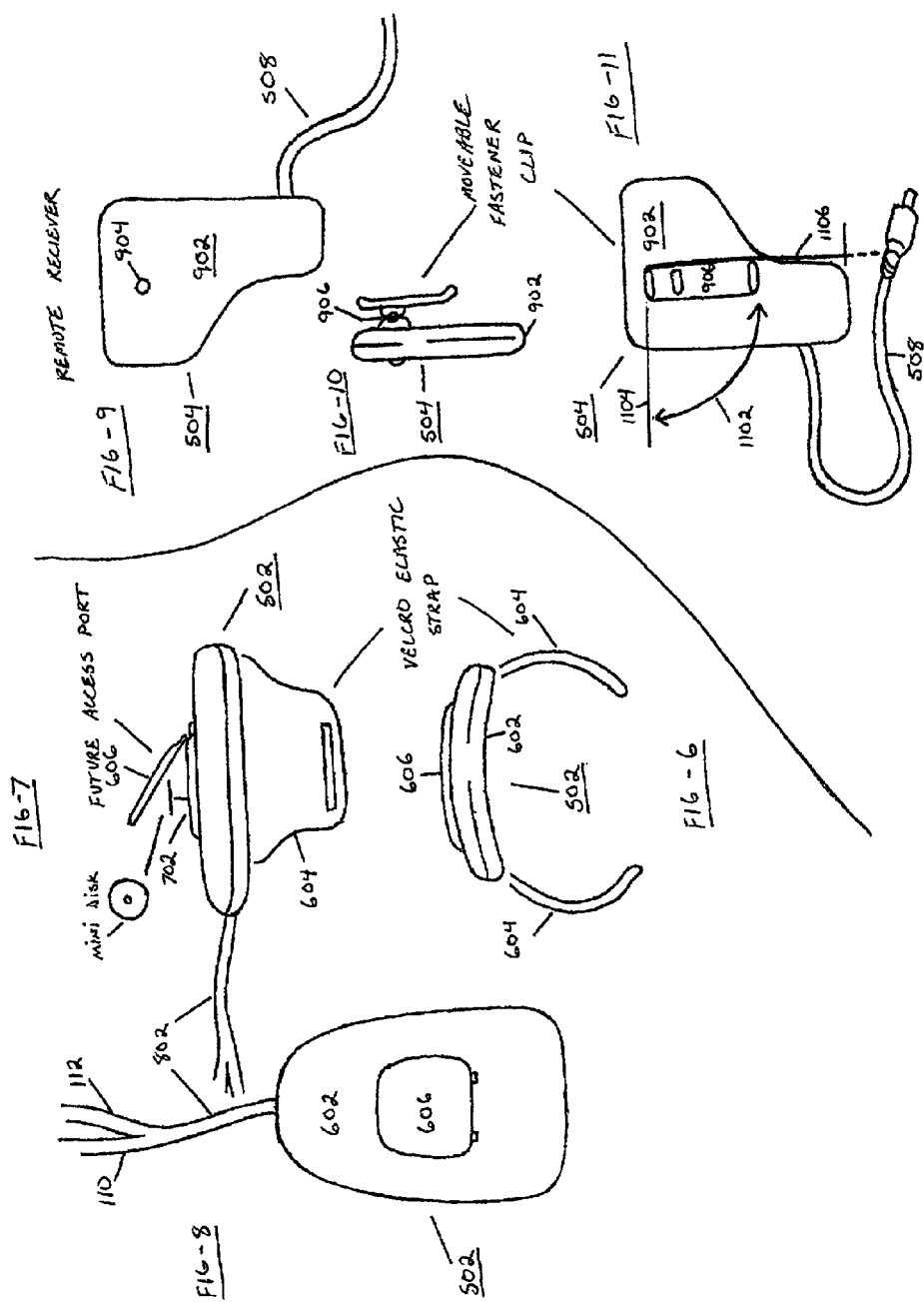

FINGER-FITTING POINTING DEVICE

BACKGROUND OF INVENTION

This invention relates generally to pointing devices, such as those used in conjunction with computing devices like computers, and more particularly to pointing devices that are finger fitting in shape.

With the advent of graphical user interfaces (GUI's) on computer systems, the pointing device has become a nearly ubiquitous device connected to computers. Pointing devices are so named because they enable the user to move a pointer on a screen, and select items pointed to, or perform other functionality, by actuating one or more different buttons. Common pointing devices include mouses, touch pads, trackballs, point sticks, joysticks, and other types of pointing devices.

An ongoing disadvantage of using pointing devices is that many of them require space beyond that taken up by the computer itself. In locations such as desks in offices, this may not be an issue, because there is likely to be sufficient desk space for both a keyboard and a pointing device like a mouse. However, in other locations, such as airplane fold-down tray tables in coach class, space for a keyboard and an external pointing device is limited, or even non-existent.

Most computer users therefore use the integrated pointing devices available on laptop and notebook computers when space is at a premium. Integrated pointing devices include the touch pad and the nub. Many users, however, do not prefer the integrated pointing devices, and would rather use an external pointing device, such as a mouse or a trackball. Miniature trackballs that clip onto the side of the computer, as well as miniature mouses that require less surface space, are available. However, these existing external devices meant for tight spaces are usually ill adapted for ease of use.

This may be because their regular counterparts anticipate a type of usage that is compromised when they are modified to use less space. For instance, most mouses are designed to fit in the palm of the hand, with each of two buttons naturally lying beneath a finger. Miniaturizing the mouse, however, compromises this design, making it more difficult to use. Similarly, most trackballs are designed for rolling by two or more fingers. Miniaturizing the trackball so that it can clipped onto the side of the laptop means that the user can only use one finger, or one thumb, for rolling, making it less natural to use.

Therefore, there is a need for a pointing device of a computer that has a design naturally suited for space-restrictive use. Such a pointing device should desirably not be a miniaturization of an existing pointing device, so that natural usage thereof is not compromised. For these and other reasons, there is a need for the present invention.

SUMMARY OF INVENTION

The invention relates to a finger-fitting pointing device. One embodiment of the invention includes two housings, each of which can be fabricated from a flexible, glove-like material. The housings fit the fingers of a user, such as the index and middle fingers. In one embodiment, the housings have open-ended tips for finger nails. A click sensor is disposed in the underside of each housing, and is actuated by the user pressing the underside of the housing with the inserted finger against an external surface. An optical sensor is also disposed within the surface of one of the housings, and detects relative movement of this surface against an external surface, as caused by relative movement of the user's finger.

The invention provide for advantages not found within the prior art. The inventive pointing device is inherently and naturally space conserving. The user slips a finger into each housing. The user moves the housing surface in which the optical sensor is disposed against an external surface, which can be, for instance, the user's thumb, to cause movement of the pointer on a screen. Actuation of the click sensors is caused by the user pressing them from inside the housings with sufficient force against a surface, which can be, for instance, an airplane fold-down tray table. Neither pointer movement nor click sensor actuation requires large amounts of space.

Besides those described here, other aspects, advantages, and embodiments of the invention will become apparent by reading the detailed description that follows and by referring to the accompanying drawings.

BRIEF DESCRIPTION OF DRAWINGS

FIG. 1 is a diagram of a perspective view of a pointing device according to an embodiment of the invention.

FIGS. 2, 3, and 4 are diagrams of side, top, and front views of the pointing device of FIG. 1.

FIG. 5 is a diagram showing a wireless embodiment of the pointing device of FIG. 1. A wired embodiment of the pointing device of FIG. 1 is also amenable to the invention.

FIGS. 6, 7, and 8 are diagrams of front, side, and top views of the wrist mechanism shown in FIG. 5.

FIGS. 9, 10, and 11 are diagrams of front, side, and back views of the base station shown in FIG. 5.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIG. 1 is a diagram of a perspective view of a pointing device 100 according to an embodiment of the invention. The pointing device includes housings 102 and 104. Each of the housings 102 and 104 is substantially shaped to fit a finger of a user. For instance, the housing 102 is shaped to fit the index finger of the right hand of the user, whereas the housing 104 is shaped to fit the middle finger of the right handle of the user. Each of the housings 102 and 104 is preferably fabricated from a flexible, glove-like material. The user inserts his or her fingers into the back ends of the housings 102 and 104, opposite to the ends in which the fingertip grips 108 are situated.

The housing 102 has situated on a surface thereof an optical sensor 106. The optical sensor detects relative movement of this surface of the housing 102 against an external surface caused by the user moving his or her index finger inserted inside the housing 102. For instance, the optical sensor 106 may be moved against the user's right thumb, such that the sensor 106 detects this movement. The relative movement of the optical sensor 106 desirably causes a pointer on a screen of a computer to correspondingly move, as can be appreciated by those of ordinary skill within the art. The optical sensor 106 can be the means for detecting relative movement in one embodiment of the invention.

The fingertip grips 108 are situated at the ends of the housings 102 and 104. The grips 108 promote normal usage of the fingertips of the user's fingers inserted into the housings 102 and 104. For instance, the grips 108 allow the user to touch type and perform other activities that he or she normally would if his or her fingers were not inserted into the housing 102 and 104. The grips 108 may be fabricated from rubber, or another material. The housings 102 and 104 also have connected thereto cables 110 and 112, respectively, as are described later in the detailed description.

FIG. 2 is a diagram showing a left-side view of the pointing device 100. The housing 104 is directly behind the housing 102, such that only the housing 102 is viewable in the view of FIG. 2. Furthermore, the optical sensor 106 is not shown in FIG. 2 for purposes of illustrative clarity. One of the grips 108, for the housing 102, and the cable 110, are also shown in FIG. 2.

The housing 102 has a click sensor 202 disposed within the underside of the housing. The click sensor 202 performs the functionality that a button on a mouse pointing device normally would. The click sensor 202 is actuated by the user pressing the underside of the housing 102 through the finger inserted in the housing 102 against an external surface with sufficient force. For instance, the user may press the housing 102 against a flat surface, such as a desktop, or another surface, such as his or her thumb. The housing 104 also has a comparable click sensor, which is not shown in FIG. 2. The click sensors of the housings 102 and 104 can be the means for actuation in one embodiment of the invention.

FIG. 3 is a diagram showing a top view of the pointing device 100, whereas FIG. 4 is a diagram showing a front view of the pointing device 100. In both the top view of FIG. 3, and the front view of FIG. 4, the housings 102 and 104, the optical sensor 106, the grips 108, and the cables 110 and 112 are visible. Furthermore, in the front view of FIG. 4, the click sensor 202 of the housing 102 is visible. The housing 104 has a click sensor 402 disposed within its underside, which operates comparably to the click sensor 202 of the housing 102.

FIG. 5 is a diagram showing how a wireless communication embodiment of the pointing device 100 operates. The user slips the index and middle fingers of his or her right hand into the housing 102 and 104, respectively. Actuations of the click sensors and relative movement detected by the optical sensor are registered with the laptop computer 506 as follows. Electrical signals representing the actuations and the detected movement are sent through the cable 110 and/or the cable 112 to the wrist mechanism 502, which is attached to the user's right wrist.

A wireless transceiver within the mechanism 502 communicates these signals with a corresponding wireless transceiver of a base station 504, which is physically attached to the computer 506. The wireless transceiver of the mechanism 502 can be the means for registering actuation and relative movement detected in one embodiment of the invention. The base station 504 has a cable 508 that ends in a connector plugging into a corresponding connector of the computer 506, over which the electrical signals received by the wireless transceiver of the base station 504 are sent to the computer 506.

In a wired communication embodiment of the invention, the cables 110 and 112 themselves end in a connector plugging into a corresponding connector of the computer 506. The electrical signals representing the actuations and the detected movement are in this embodiment sent directly to the computer 506 over the cables 110 and 112. The cables 110 and 112 can be the means for registering actuation and relative movement detected in one embodiment of the invention. In either the wired or the wireless embodiment, however, the actuations of the click sensors and the relative movement detected by the optical sensor are registered with the computer 506, which can perform actions in response to such actuations and detected movement. Actuations of the click sensors are comparable to actuations of the buttons of a mouse pointing device, whereas detected movement by the optical sensor is comparable to detected movement of a mouse pointing device along a flat horizontal surface.

FIGS. 6, 7, and 8 are diagrams showing the front, left-side, and top views of the wrist mechanism 502 in more detail. The housing 602 encloses the wireless transceiver that communicates with a corresponding wireless transceiver of a computer. Attached to the bottom of the housing 602 are wrist straps 604, so that the mechanism 502 can be attached to the right wrist of the user. The cover 606 covers an expansion slot 702 that is receptive to a corresponding expansion card, the data stored on which is then accessible to the computer through wireless communication between the wireless transceiver of the wrist mechanism 502 and the wireless transceiver of the computer. The expansion card may be a mini disc, a smart card, or another type of expansion card. Finally, a cable 802 connects the housing 602 to the housings 102 and 104 (not shown in FIGS. 6, 7, and 8), through their cables 110 and 112, respectively.

FIGS. 9, 10, and 11 are diagrams showing the front, side, and back views of the base station 504 in more detail. The housing 902 encloses the wireless transceiver that communicates with a corresponding wireless transceiver of the wrist mechanism 502 (not shown in FIGS. 9, 10, and 11). The eyelet 904 exposes an antenna of the wireless transceiver enclosed by the housing 902 for maximum wireless communication range of the transceiver. The cable 508 ends in a connector plugging into a corresponding connector of the computer.

The base station 504 is attachable to a computer by its fastener clip 906. The fastener clip 906 is rotatable, as indicated by the arrow 1102. By moving the clip 906 to the position indicated by the line 1104, holding the base station 504 against a relatively thin surface of the computer, and then moving the clip 906 to the position indicated by the line 1106, the user is able to attach the station 504 to the computer. Other types of attachment mechanisms are also amenable to the invention.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

The invention claimed is:

1. A pointing device comprising:

a housing substantially shaped to fit a finger of a user and ending in a grip, a shape of the housing and the grip promoting normal usage of a tip of the finger of the user while the finger is inserted into the housing, including touch-typing;

a click sensor disposed within an underside of the housing, the click sensor actuated by the user pressing the underside of the housing through the finger against a first external surface with sufficient force; and, a optical sensor disposed within a surface of the housing, the optical sensor detecting relative movement of the surface of the housing along two axes against a second external surface caused by relative movement of the finger of the user to cause a pointer on a screen of a computer to correspondingly move, wherein the first external surface and the second external surface are each external to the pointing device.

2. The pointing device of claim 1, wherein the housing is fabricated from a flexible, glove-like material.

3. The pointing device of claim 1, wherein the finger of the user as to which the housing is specifically receptive is an index finger of the user.

4. The pointing device of claim 1, further comprising:
a second housing substantially shaped to fit a second finger of the user; and,
a second click sensor disposed within an underside of the second housing, the second click sensor actuated by the user pressing the underside of the second housing through the second finger against the first external surface with sufficient force.

5. The pointing device of claim 4, further comprising a grip situated at an end of the second housing, the grip promoting normal usage of a tip of the second finger of the user.

6. The pointing device of claim 4, wherein the second housing is fabricated from a flexible, glove-like material.

7. The pointing device of claim 4, wherein the second finger of the user is a middle finger of the user.

8. The pointing device of claim 1, further comprising a wireless transceiver for wireless communication with a corresponding wireless transceiver of a computing device, such that the actuation of the click sensor and the relative movement detected by the optical sensor are registered with the computing device through the wireless communication.

9. The pointing device of claim 8, further comprising:
a second housing attachable to a wrist of the user and in which the wireless transceiver is disposed; and,
a cable connecting the second housing to the housing.

10. The pointing device of claim 9, further comprising an expansion slot disposed within the second housing and receptive to a corresponding expansion card, data stored on which is accessible to the computing device through the wireless communication.

11. The pointing device of claim 1, wherein the first external surface and the second external surface are a same surface.

12. The pointing device of claim 1, further comprising a cable ending in a connector for connection to a corresponding connector of a computing device, such that the actuation of the click sensor and the relative movement detected by the optical sensor are registered with the computing device through the cable.

13. A pointing device comprising:
a first and a second housing, each housing substantially shaped to fit a finger of a user and ending in a grip, a shape of each housing and the grip promoting normal usage of a tip of the finger while the finger is inserted into the housing, including touch-typing;
a first and a second click sensor, each click sensor disposed within an underside of a corresponding one of the first and the second housing and actuated by the user pressing the underside of the corresponding one of the first and the second housing through the finger against a first external surface with sufficient force; and,
an optical sensor disposed within a surface of only the first housing, the optical sensor detecting relative movement of the surface of the housing against a second external surface caused by relative movement of the finger of the user that the first housing is substantially shaped to fit.

14. The pointing device of claim 13, further comprising a grip situated at an end of each of the first and the second housings.

15. The pointing device of claim 13, further comprising a cable ending in a connector for connection to a corresponding connector of a computing device, such that the actuation of the first and the second click sensors and the relative movement detected by the optical sensor are registered with the computing device through the cable.

16. The pointing device of claim 13, further comprising a wireless transceiver for wireless communication with a corresponding wireless transceiver of a computing device, such that the actuation of the first and the second click sensors and the relative movement detected by the optical sensor are registered with the computing device through the wireless communication.

17. A pointing device comprising:
a finger glove substantially shaped to fit a finger of a user and ending in a grip, a shape of the finger glove and the grip promoting normal usage of a tip of the finger of the user while the finger is inserted into the finger glove, including touch-typing;
means for detecting actuation by the user disposed within the finger glove; and,
means for detecting relative movement of the finger glove against an external surface external to the pointing device.

18. The pointing device of claim 17, further comprising:
a second finger glove; and,
means for detecting actuation by the user disposed within the second finger glove.

19. The pointing device of claim 17, further comprising means for registering the actuation by the user and the relative movement detected with a computing device.

* * * * *